(12) United States Patent
Mekid et al.

(10) Patent No.: US 9,366,596 B2
(45) Date of Patent: Jun. 14, 2016

(54) PIPELINE LEAK DETECTOR

(71) Applicant: KING FAHD UNIVERSITY OF PETROLEUM AND MINERALS, Dhahran (SA)

(72) Inventors: Samir Mekid, Dhahran (SA); Rached Ben-Mansour, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 324 days.

(21) Appl. No.: 14/025,751

(22) Filed: Sep. 12, 2013

(65) Prior Publication Data

US 2014/0345367 A1    Nov. 27, 2014

Related U.S. Application Data

(63) Continuation-in-part of application No. 13/899,527, filed on May 21, 2013.

(51) Int. Cl.
| | | |
|---|---|---|
| *G01M 3/28* | (2006.01) | |
| *G01M 3/00* | (2006.01) | |
| *G01M 3/26* | (2006.01) | |
| *F16L 101/30* | (2006.01) | |

(52) U.S. Cl.
CPC ............ *G01M 3/2823* (2013.01); *G01M 3/005* (2013.01); *F16L 2101/30* (2013.01)

(58) Field of Classification Search
CPC ......... G01M 3/005; G01M 3/08; G01M 3/26; G01M 3/2853; G01M 3/2815
USPC ..................... 73/40, 40.5 R, 40.5 A, 720–721
See application file for complete search history.

(56) References Cited

U.S. PATENT DOCUMENTS

| | | | |
|---|---|---|---|
| 3,508,433 A | | 4/1970 | Bustin |
| 3,561,256 A | | 2/1971 | Bustin et al. |
| 4,020,674 A | | 5/1977 | Fechter et al. |
| 4,055,315 A | * | 10/1977 | Gvelesiani ............ B65G 51/04 104/138.1 |
| 4,177,734 A | * | 12/1979 | Rhoden ................... B08B 9/049 104/138.2 |
| 4,372,151 A | | 2/1983 | Muraviev et al. |
| 4,537,136 A | * | 8/1985 | Douglas .................. F16L 55/30 104/138.2 |
| 4,677,865 A | * | 7/1987 | Lehmann ................ F16L 55/30 104/138.2 |
| 5,565,633 A | * | 10/1996 | Wernicke ........... G01N 27/9013 324/220 |
| 7,980,136 B2 | * | 7/2011 | Ben-Mansour ......... G01M 3/22 73/40.5 A |
| 2012/0007744 A1 | | 1/2012 | Pal et al. |
| 2012/0255343 A1 | | 10/2012 | Sarma et al. |
| 2012/0272722 A1 | * | 11/2012 | Khalifa ............... G01M 3/2823 73/40.5 R |

* cited by examiner

*Primary Examiner* — Peter Macchiarolo
*Assistant Examiner* — Anthony W Megna Fuentes
(74) *Attorney, Agent, or Firm* — Richard C. Litman

(57) ABSTRACT

The pipeline leak detector is a mobile device having a pressure sensor array for travel within a fluid pipeline for leak detection in the pipe wall. The sensor array is positioned close to the internal surface of the pipe wall and rotates circumferentially about the surface of the pipe wall as the device travels through the pipe, thus describing a helical path along the pipe wall to cover the entire internal surface of the pipe wall with a minimal number of sensors. The sensors comprise tubes with conical mouths, and flexible members and strain gauges within the tubes. Pressure changes due to leaks cause the flexible members to move, with the strain gauges sending signals to a central processor to indicate a leak. The device is supported by a drive wheel, a driven wheel, and an idler wheel bearing against the internal surface of the pipe and evenly circumferentially spaced.

14 Claims, 6 Drawing Sheets

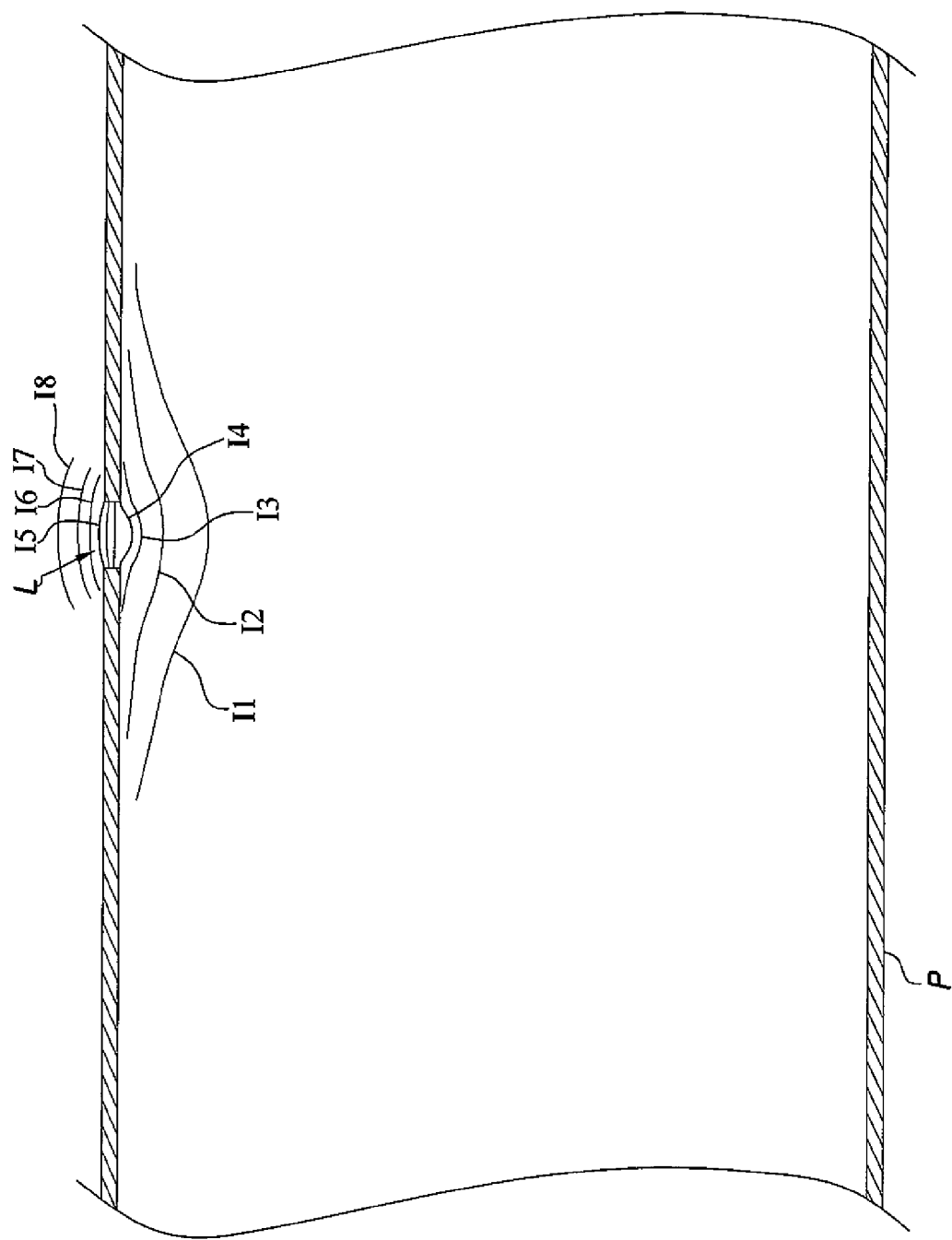

PIPELINE LEAK DETECTOR

CROSS-REFERENCE TO RELATED APPLICATIONS

This application is a continuation-in-part of our prior U.S. patent application Ser. No. 13/899,527, filed May 21, 2013.

BACKGROUND OF THE INVENTION

1. Field of the Invention

The present invention relates generally to fluid conveyance using pipes, conduits, and the like, and particularly to a pipeline leak detector employing a drive system for the helical motion of an array of pressure sensing ports along the interior wall of the pipe.

2. Description of the Related Art

Oil and natural gas are likely the two fluids that are first considered when the transport of fluids through pipelines is considered. However, water is a very valuable commodity in many arid parts of the world and water transport via pipelines is a major industry in many areas. Accordingly, considerable research and development has gone into the development of technologies directed to the detection of water leaks in water pipelines. Various principles of leak detection have been developed, including acoustic leak noise correlators and surface listening devices, ground penetrating radar, infrared thermography, and chemical tracing. These methods or principles have a number of limitations when used for the detection of leaks in water distribution networks or pipe systems. The apparatus for these leak detection systems and devices can be quite costly, and their use may be labor intensive and time consuming. Moreover, the results may not be sufficiently accurate and may have noise interference problems in the case of acoustic leak detection systems. All depend at least to some extent upon the material of which the pipe is formed.

Acoustic (noise) detectors are widely used by various municipalities to detect leaks in water lines. Acoustic systems work well in metal pipe, but the effectiveness of acoustic leak detection is questionable with plastic pipe due to high signal attenuation, low frequency content, and the fittings and joints along the pipes affecting acoustic wave propagation. A relatively recent development has been the use of "pigs," or robotic devices that travel through the interior of the pipeline using pressure differential sensors to detect leaks. These in-pipe mobile sensors, e.g., Sahara® and Smartball®, may overcome many of the shortcomings of conventional acoustic leak detection systems. The desirability of such in-pipe mobile sensors arises from their ability to survey relatively long distances through pipelines in a pipe network, which may be difficult to access using other leak detection techniques.

One limitation of such pressure differential sensors in in-pipe mobile systems is the necessity of placement of the sensors extremely close to the leak, due to the relatively small pressure gradient until very close to the leak. When a sufficient number of detectors is provided, leak detection is less dependent upon pipe material (metal or plastic), pipe depth and soil type, background noise, and perhaps other factors. However, a small leak in a pipe wall may subtend only a small fraction of the internal circumference of the pipe. Accordingly, a large number of pressure sensors are conventionally required in order to cover substantially the entire internal circumference of the pipe as the mobile apparatus travels through the pipe. As an example, a pipe having a diameter of 30 centimeters (cm) would have an internal circumference on the order of 100 cm. A 2 millimeter (mm) diameter leak would require about 50 detectors arranged in a circumferential array about an in-pipe traveling leak detector device for such a pipe, if each of the detectors could cover a lateral span of 1 cm along the pipe wall.

Thus, a pipeline leak detector solving the aforementioned problems is desired.

SUMMARY OF THE INVENTION

The pipeline leak detector is a mobile device, i.e., a pipeline "pig," adapted for travel within and through a fluid pipeline for the detection of leaks within the pipeline. The device includes a single pressure sensor array disposed adjacent to the internal surface of the pipe wall. The sensor array is formed of three or four closely spaced, generally funnel-shaped leak detectors having flexible valves or diaphragms therein. Strain gauges or sensors are attached thereto to provide a signal when the valves or diaphragms are moved due to changes in pressure from an adjacent leak. The sensor array thus subtends only a fraction of the internal circumference of the pipe. A mechanism is provided to rotate the sensor array about the internal circumference of the pipe as the leak detector travels longitudinally through the pipe. Thus, the sensor array describes a helical path along the interior surface of the pipe wall to insure complete coverage of the entire internal surface of the pipe. Spacing between the pressure sensor array and the interior surface of the pipe wall is carefully controlled for optimum results.

The leak detector includes a drive and support portion having three wheels extending radially therefrom, evenly separated by 120° of arc. All three wheels bear against the internal surface of the pipe wall, and serve to center the leak detector within the pipe. One of the wheels is a powered drive wheel that provides propulsion to drive the detector through the pipe. Another of the wheels is rotated by its frictional engagement with the interior surface of the pipe wall. This wheel communicates rotationally with the pressure sensor array in order to rotate the array circumferentially about the interior of the pipe wall to describe the helical path as the leak detector travels through the pipe. The third wheel is an idler or stabilizer wheel and rolls passively along the internal surface of the pipe wall to provide a third point of contact of the leak detector with the pipe wall. The axial alignment of the rotational paths of the three wheels precludes any axial rotation of the drive and support portion of the apparatus within the pipe.

Electronic componentry may be included with the leak detector. The stabilizer wheel (or one of the other wheels) may serve as an odometer, transmitting distance traveled to a central processor. The pressure sensors signal the processor when a drop in pressure is detected along the pipe wall, also providing their circumferential position about the pipe wall when the leak is detected. This information as to the axial location of the leak detector in the pipe and the circumferential position of the affected sensor array may be stored in the central processor, or may be transmitted to a data retrieval source external to the pipe, if such equipment is provided.

These and other features of the present invention will become readily apparent upon further review of the following specification and drawings.

BRIEF DESCRIPTION OF THE DRAWINGS

FIG. 7 is an elevation view in section of a portion of a pipeline having a leak therein, illustrating the pressure pattern disposed about the leak.

Similar reference characters denote corresponding features consistently throughout the attached drawings.

DETAILED DESCRIPTION OF THE PREFERRED EMBODIMENTS

The pipeline leak detector is a "pig" type device adapted for robotic travel within a fluid pipeline for the detection of fluid leaks in the pipeline wall. The device accomplishes this with a minimal number of sensors. The sensors rotate within the pipe to cover the entire interior surface of the pipe wall as the device travels through the pipe. The pipeline leak detector is particularly well suited for use in water pipelines, but may be adapted for use in pipes carrying oil, gas, and/or other fluids as well.

Figure 1:
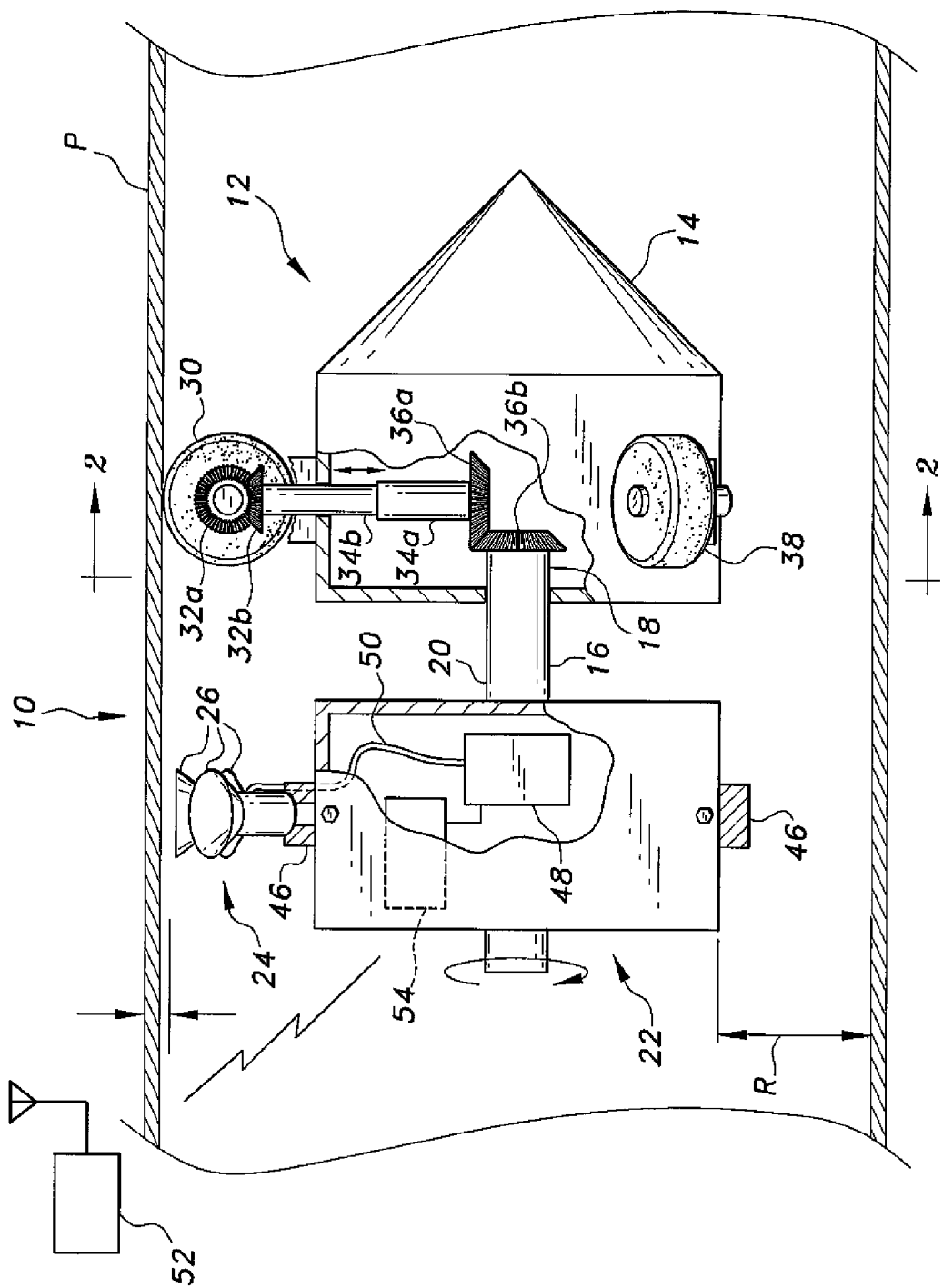
FIG. 1 is an environmental elevation view in section of a pipeline showing the pipeline leak detector according to the present invention disposed therein, illustrating various details thereof.

FIG. 1 of the drawings provides an elevation view in section of the pipeline leak detector 10 disposed within a pipe P. The leak detector 10 has a rotationally stationary drive component 12 having a central housing 14. The drive component and its housing are restrained from axial rotation within the pipe P by a series of supporting wheels, described in detail further below. A rotary driveshaft 16 extends axially from the drive component 12 and its housing 14. The driveshaft 16 has a drive component end 18 disposed within the housing 14 and an opposite sensor array end 20. A leak detector component 22 is disposed upon the sensor array end 20 of the driveshaft 16. The leak detector component 22 has a single leak sensor array 24 extending radially therefrom that subtends a limited arc (e.g., thirty degrees, more or less) about the leak detector component 22.

Figure 2:
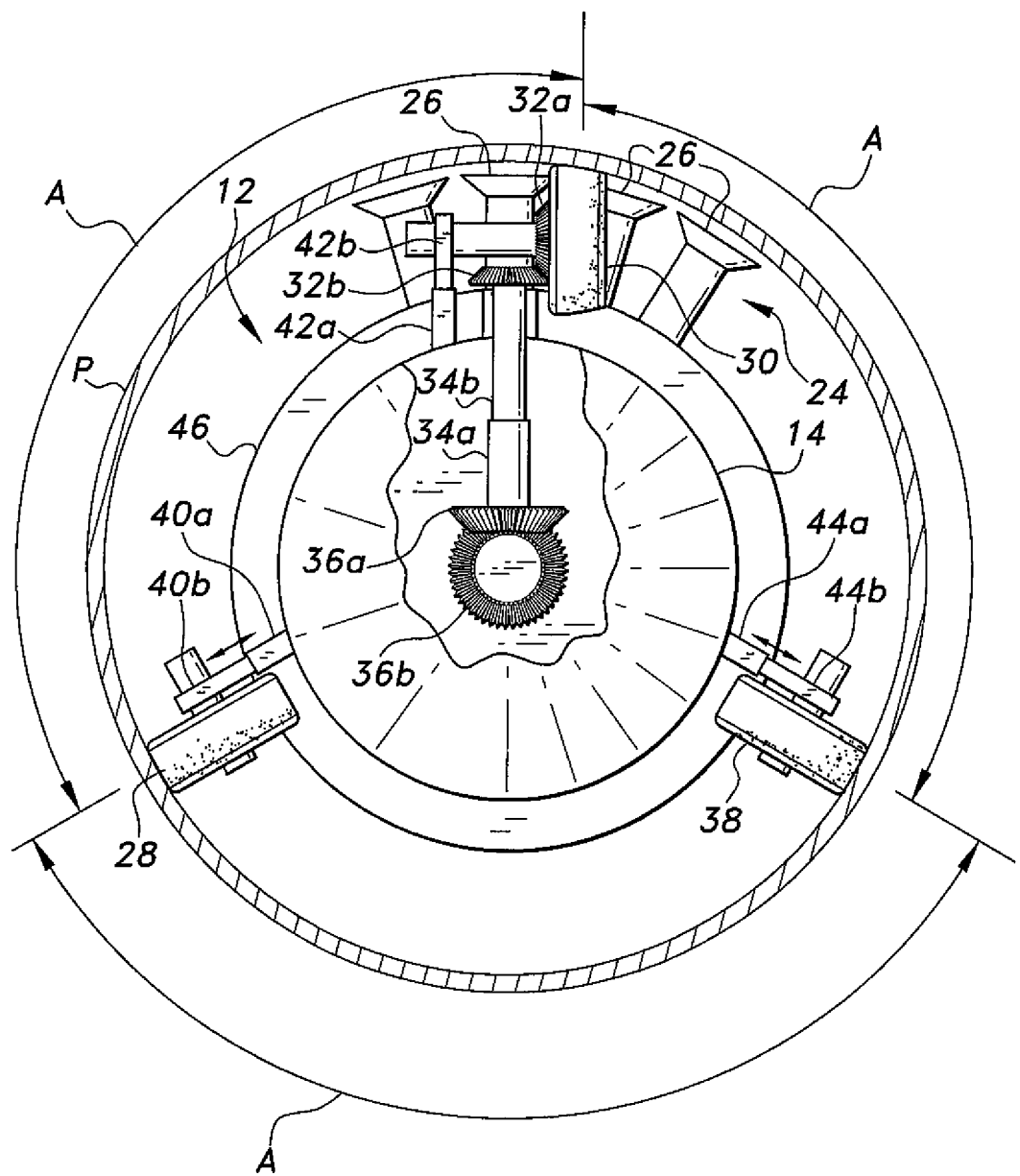
FIG. 2 is a section view along lines 2-2 of FIG. 1.
Figure 3:
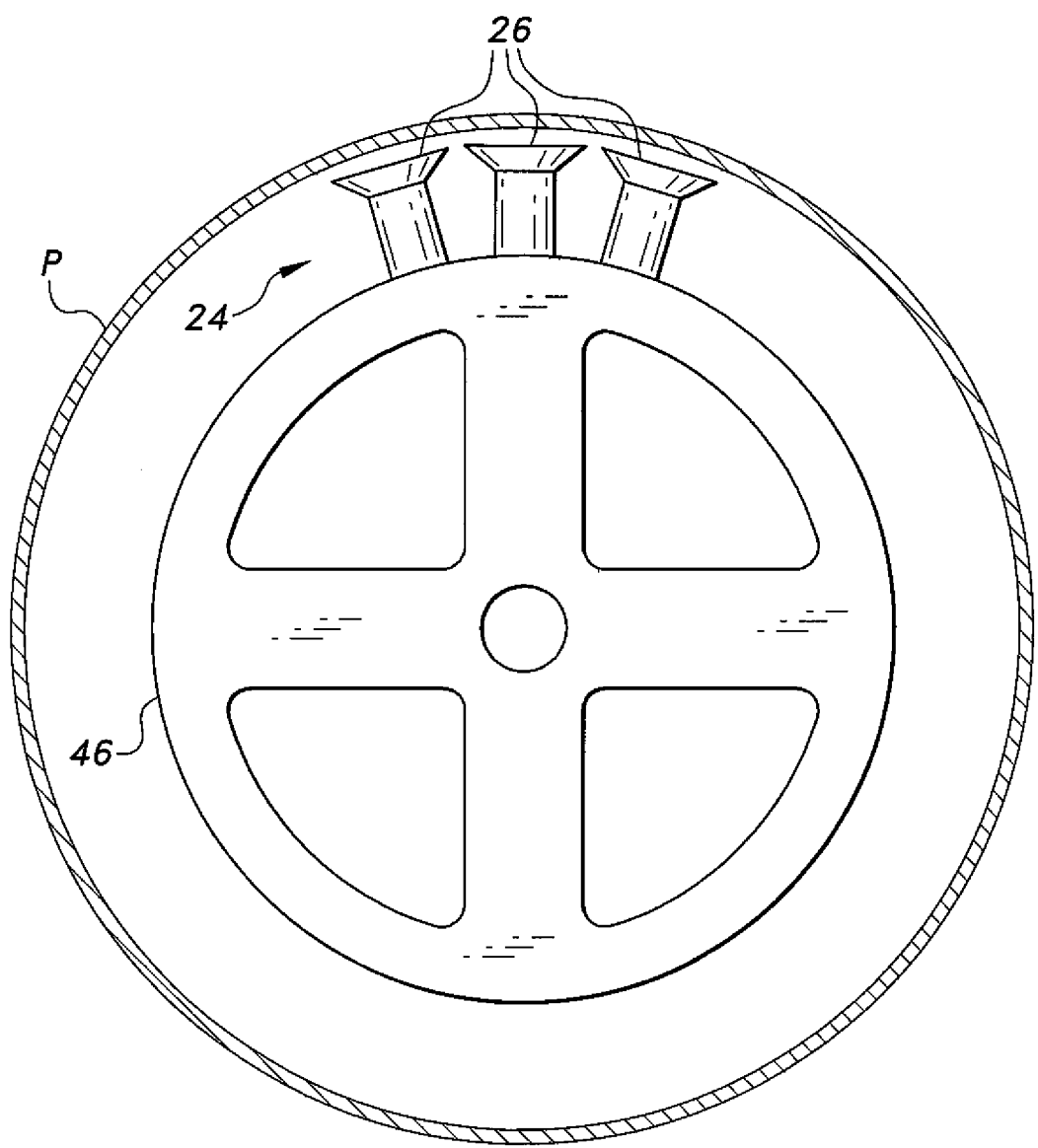
FIG. 3 is an elevation view of the sensor holding wheel and leak sensors disposed thereon of the pipeline leak detector of FIG. 1.
Figure 4:
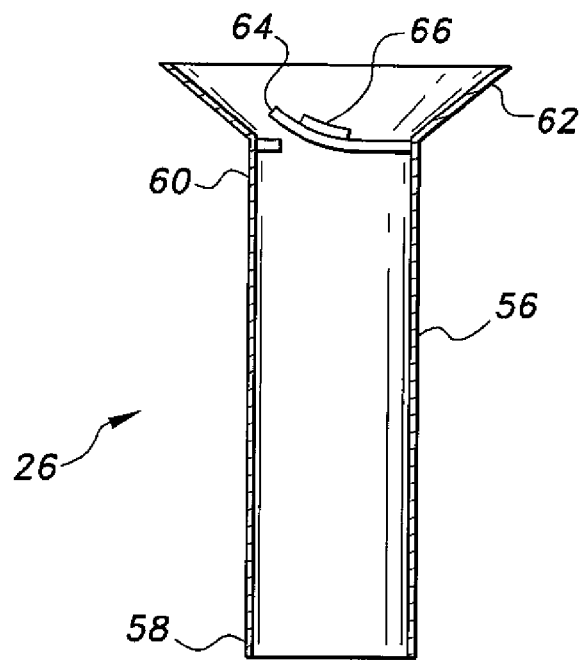
FIG. 4 is an elevation view in section of a first embodiment of a leak sensor of the pipeline leak detector of FIG. 1.
Figure 5:
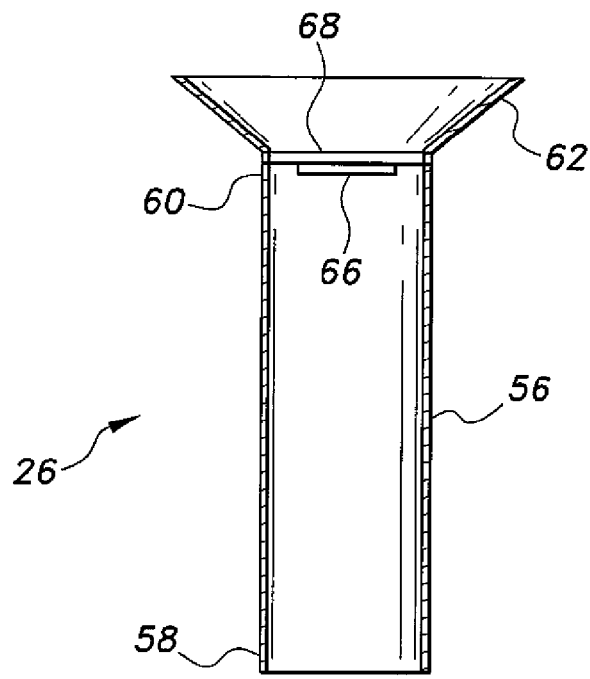
FIG. 5 is an elevation view in section of a second embodiment of a leak sensor of the pipeline leak detector of FIG. 1.

The sensor array 24 comprises a plurality of pressure sensors 26 extending radially from a sensor array support wheel 46, which is installed concentrically about the central body of the leak detector component 22. The sensors 26 are adapted for the detection of minor pressure changes along the wall of the pipe P as the device 10 travels through the pipe. The leak detector component 22 and the sensor array 24 extending radially therefrom are driven in axial rotation within the pipe P as the rotary driveshaft 16 rotates. The leak sensors are force sensors, having either a gate or a membrane that moves and generates an electronic signal when a leak is detected. Two different pressure sensor embodiments are described herein, which are illustrated in FIGS. 4 and 5, respectively, and described in detail further below. FIGS. 2 and 3 also illustrate sensor arrays 24. The array of FIG. 2 has four sensors 26, and the array of FIG. 3 shows three such sensors 26. The precise number of sensors is adjusted in consideration of the diameter of the pipe P, the diameters of the sensors 26, and the axial and radial velocities of the sensors as they travel through the pipe P.

The drive component 12 and central housing 14 of the leak detector 10 are supported by three radially disposed wheels. The wheels travel along the interior surface of the pipe wall as the device 10 travels through the pipe. The three wheels are distributed evenly about the circumference of the leak detector 10 and are separated by substantially equal angular arcs A of about 120° each, as shown in FIG. 2 of the drawings. A rotationally powered drive wheel 28 rolls along the interior surface of the pipe P wall. The drive wheel 28 provides motive power for the leak detector 10 to drive the device 10 through the interior of the pipe P. The drive wheel 28 may be powered by a small electric motor disposed within the wheel hub. The motor receives electrical power from an on-board electrical storage battery disposed within the drive component 12. Such motors and electrical power battery systems are well known, and accordingly are not described in further detail herein.

A driven wheel 30 extends radially from the central housing 14 and rolls along the interior of the pipe P. The driven wheel 30 has a concentric first bevel gear 32a at its hub. The first bevel gear 32a drives a second bevel gear 32b disposed upon the distal end portion 34b of a driven wheel shaft. The shaft has a proximal end portion 34a disposed within the central housing 12 and extending radially therefrom. The distal end portion 34b telescopes within the proximal end portion 34a to allow the driven wheel shaft assembly to lengthen and shorten according to the diameter of the pipe P. The two driven wheel shaft portions 34a and 34b are locked rotationally to one another by splines, key and keyway, non-circular sections, or other conventional means. A third bevel gear 36a is affixed to the proximal end portion 34a of the driven wheel shaft assembly. A fourth bevel gear 36b is affixed to the drive component end 18 of the leak detector component driveshaft 16 and meshes with the third bevel gear 36a, as shown in FIG. 1. This gear train drives the leak detector component driveshaft 16 and the leak detector component 22 extending therefrom rotationally as the driven wheel 30 rotates due to its frictional engagement with the wall of the pipe P as the leak detector 10 travels through the pipe. Alternative means of transmitting the rotary motion of the driven wheel 30 to the driveshaft 16 may be provided, e.g., a flexible shaft, hydraulics, etc.

The third wheel is an idler or stabilizer wheel 38 extending radially from the drive component 12, or more properly from its central housing 14, and serves primarily as a third point defining the transverse span of the drive component 12 across the interior of the pipe P. The idler or stabilizer wheel 38 is a passive support wheel with no drive means, i.e., no means of propelling the leak detector 10 through the pipe P, and has no means of driving the rotation of the driveshaft 16 and its leak detector 12. However, the stabilizer wheel 38 may include means for transmitting its rotary motion to a central processor (discussed further below) for translation to distance traveled by the pipeline leak detector 10 as it travels through the pipe P. This function may alternatively be handled by one of the other two wheels 28 or 30, particularly the driven wheel 30, as it is already imparting rotary motion to the driveshaft 16 that is connected to the drive component 18 of the device.

The driven wheel shaft can adjust inward and outward to adjust for different pipe diameters by means of its mutually telescoping proximal and distal portions 34a and 34b, as noted above. Accordingly, the positions of the three wheels 28, 30, and 38 may be adjusted for different pipe diameters. Each of the wheels is supported by an adjustable length strut that extends radially from the drive component 12, or more properly, from the housing 14 of the drive component. The drive wheel 28 is supported by a drive wheel strut having a proximal portion 40a and a distal portion 40b that telescopes in and out of the proximal portion 40a to adjust its length. The driven wheel 30 is supported in the same manner by a driven wheel strut having a proximal portion 42a and a distal portion 42b that telescopes in and out of the proximal portion 42a. The idler or stabilizer wheel 38 is also supported in the same manner by a stabilizer wheel strut having a proximal portion 44a and a distal portion 44b that telescopes in and out of its proximal portion 44a. The pipeline leak detector 10 may thus be adjusted for use in different diameters of pipes P by adjusting the lengths of the driven wheel shaft, the three wheel struts, and the radial spans of the sensors 26 of the sensor array 24.

Figure 6:
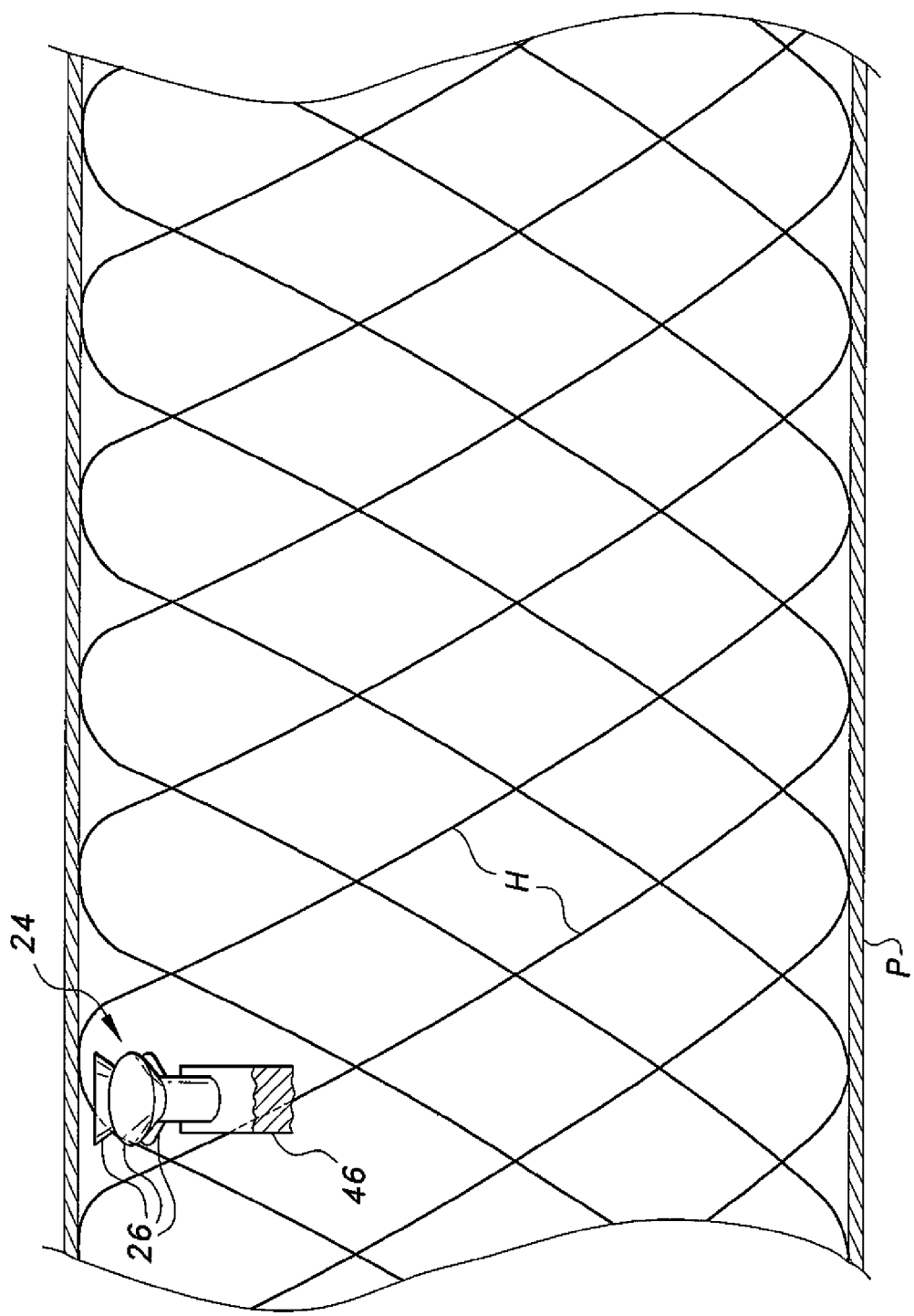
FIG. 6 is a schematic section view through a pipeline illustrating the helical path traveled by the sensors of the pipeline leak detector according to the present invention.

The longitudinal or axial motion of the pipeline leak detector 10 through the pipe P results in a rotary motion of the leak detector component 22 and its sensor array 24 by means of the drive wheel 30 and its driveshaft and gearing, as described in detail further above. The drive component 12 of the leak detector is restricted from rotating about its longitudinal axis within the pipe P due to the alignment of the wheel rotation or tracks parallel to the longitudinal axis of the pipe. However, the combination of the longitudinal motion of the leak detector 10 and the rotary motion of the leak detector component 22 and its sensor array 24 results in the sensor array 24 describing a helical path H immediately adjacent the inner surface of the pipe wall, as shown in FIG. 6 of the drawings. (The helical path illustrated in FIG. 6 is shown in its complete appearance through 360° of rotation within the inner circumference of the pipe P.) The diameter of the drive wheel 30 and the gear ratios of the first through fourth bevel gears 32a, 32b, 36a, and 36b are selected to provide complete coverage of the interior of the pipe wall as the sensor array 24 travels along its helical path H. It will be seen that by increasing the rotational speed of the leak detector component 22 relative to the longitudinal speed of the device 10 through the pipe P, it is possible to use only a single leak detector array 24.

The pipeline leak detector 10 is adapted to travel through a pipeline P carrying water, oil, gas, or other fluid in search of leaks L, as shown in FIG. 7 of the drawings. Any leak L will result in a pressure drop across the leak, as the fluid flows from the relatively higher pressure within the pipe P to the lower pressure outside the pipe (or vice versa) and the flow accelerates through the leak aperture. FIG. 7 provides a representation of this phenomenon. The pressure is represented by a series of isobars I1 through I8 (with other closely spaced isobars being shown within the leak aperture). The more closely spaced the isobars are over a given distance or span, the greater the pressure drop over the given distance. The pressure drop within the pipe P, represented by the isobars I1 through I4, is of primary interest here. It will be noted that in order to detect this pressure drop, the detector or sensor must be quite close to the leak L, as the pressure does not change significantly at some distance from the leak, as indicated by the relatively widely spaced isobars I1 and I2. Accordingly, the helical path H traveled by the sensor array 24 assures that complete coverage of the interior of the pipe wall will occur as the pipeline leak detector 10 travels through the pipe P so that at least one of the pressure sensors 26 passes nearly directly over the leak to register the pressure drop.

Returning to FIG. 1 of the drawings, it will be noted that each of the pressure sensors 26 is connected to a central processor 48 by a wiring harness 50. The central processor 48 receives pressure drop signals from each of the pressure sensing elements 26 whenever such a pressure drop is sensed by an individual sensor or sensors. The central processor 48 also communicates electronically with the rotationally stationary drive component 12, e.g., via slip rings or other conventional means. The central processor 48 registers both the location of the leak detector 10 within the pipe P by means of the odometer information provided by one of the three wheels 28, 30, or 38, and also registers the angular relationship between the leak detector component 22 and its sensor array 24 relative to the drive component 12. Thus, whenever a leak is detected, the central processor 48 records this information to enable a technician or other person to determine not only the axial location of the leak along the length of the pipe P, but also the circumferential location of the leak about the pipe. This information may be recorded by the central processor 48, and/or may be transmitted to a remote external receiver 52 by an on-board transmitter 54 communicating with the receiver 52, if desired.

FIGS. 4 and 5 illustrate two different pressure differential leak sensors, or more precisely, two different detectors that may be installed within the pressure differential leak sensor 26. The pressure differential leak sensor 26 essentially comprises a radially disposed tube 56 having a support wheel attachment end 58 and an opposite outer end 60, with a frustoconical mouth 62 extending from the outer end 60. In the embodiment of FIG. 4, a flexible valve 64 extends across the juncture of the mouth 62 and the outer end 60 of the tube 56. The valve 64 includes a strain gauge 66 thereon. The strain gauge 66 is electrically connected to the central processor 48 by a wiring harness 50, as shown in FIG. 1 of the drawings. As the mouth 62 of the sensor 26 passes over a leak, the drop in pressure at the leak results in fluid flow through the tube 56, thus flexing the valve 64 outward as shown in FIG. 4 as the fluid flows therethrough and altering the electrical characteristics of the attached strain gauge 66 to send a signal to the processor 48.

The pressure differential leak sensor 26 of FIG. 5 has an identical outer structure, i.e., tube 56 with its inboard attachment end 58 and opposite outer end 60 and frustoconical mouth 62 extending from the outer end 60. However, rather than having an opening valve within the juncture of the outer end 60 of the tube and the frustoconical mouth 62, a closed or sealed flexible diaphragm 68 is applied across this juncture. A strain gauge 66, which may be substantially identical to the strain gauge illustrated in the embodiment of FIG. 4, is installed upon the flexible diaphragm 68. The strain gauge 66 may be installed either outward or inward on the diaphragm 68 or the valve 64 of the embodiment of FIG. 4, as desired. As the mouth 62 of the sensor 26 of FIG. 5 passes over a leak, the drop in pressure at the leak results in a differential pressure between the interior of the tube 56 and the mouth 62 of the tube, thus distending the sealed diaphragm 68 outward as shown in FIG. 5 and altering the electrical characteristics of the attached strain gauge 66 to send a signal to the processor 48.

It is to be understood that the present invention is not limited to the embodiments described above, but encompasses any and all embodiments within the scope of the following claims.

We claim:
1. A pipeline leak detector, comprising:
a rotationally stationary drive component;
a rotary driveshaft extending axially from the drive component;
a leak detector component disposed upon the driveshaft, the leak detector component being driven in axial rotation relative to the drive component;
a leak sensor support wheel disposed circumferentially about the leak detector component; and
a single leak sensor array disposed radially outward from the leak sensor support wheel, the leak sensor array having a plurality of pressure differential sensing leak sensors thereon, each of the leak sensors communicating electrically with the leak detector component, wherein each of the pressure differential sensing leak sensors comprises:
a radially disposed tube having an attachment end and an outer end;
a frustoconical mouth extending from the outer end of the tube;
a flexible valve disposed at the juncture of the frustoconical mouth and the outer end of the tube, the valve being movable between an open position and a closed position in response to pressure changes; and
a strain gauge disposed upon the flexible valve, the strain gauge communicating electronically with the leak detector component.

2. The pipeline leak detector according to claim 1, wherein the rotationally stationary drive component has a central housing, the pipeline leak detector further comprising:
a rotationally powered drive wheel extending radially from the central housing;
a driven wheel extending radially from the central housing;
a stabilizer wheel extending radially from the central housing, the drive wheel, the driven wheel, and the stabilizer wheel being separated from one another by substantially 120° of arc, the rotary driveshaft having a drive component end and a sensor array end, said leak detector component being disposed upon the sensor array end of the driveshaft.

3. The pipeline leak detector according to claim 2, further comprising:
a drive wheel strut extending radially from the drive component, the drive wheel strut having an adjustable length;
a driven wheel strut extending radially from the drive component, the driven wheel strut having an adjustable length; and
a stabilizer wheel strut extending radially from the drive component, the stabilizer wheel strut having an adjustable length.

4. The pipeline leak detector according to claim 1, wherein the rotationally stationary drive component has a central housing and the rotary driveshaft has a drive component end and a sensor array end, said leak detector component being disposed upon the sensor array end of the driveshaft, the pipeline leak detector having:
a driven wheel shaft extending radially from the central housing, the driven wheel shaft having a proximal end disposed within the central housing and a distal end disposed external to the housing;
a driven wheel disposed upon the distal end of the driven wheel shaft;
a first bevel gear disposed upon the driven wheel;
a second bevel gear disposed upon the distal end of the driven wheel shaft, the second bevel gear meshing with the first bevel gear;
a third bevel gear disposed upon the proximal end of the driven wheel shaft; and
a fourth bevel gear disposed upon the drive component end of the driveshaft, the third bevel gear meshing with the fourth bevel gear;
whereby rotation of the driven wheel shaft by the driven wheel rotates the driveshaft and the leak detector component thereon.

5. The pipeline leak detector according to claim 1, further comprising:
a transmitter disposed within the leak detector component; and
a remotely disposed receiver selectively communicating with the transmitter.

6. A pipeline leak detector, comprising:
a rotationally stationary drive component, having:
a central housing;
a rotationally powered drive wheel extending radially from the central housing;
a driven wheel extending radially from the central housing; and
a stabilizer wheel extending radially from the central housing, the drive wheel, the driven wheel, and the stabilizer wheel being separated from one another by substantially 120° of arc;
a leak detector component extending axially from the drive component, the leak detector component being driven in axial rotation relative to the drive component;
a leak sensor support wheel disposed circumferentially about the leak detector component; and
a single leak sensor array disposed radially outward from the leak sensor support wheel, the leak sensor array having a plurality of pressure differential sensing leak sensors thereon, each of the leak sensors communicating electrically with the leak detector component, wherein each of the pressure differential sensing leak sensors comprises:
a radially disposed tube having an attachment end and an outer end;
a frustoconical mouth extending from the outer end of the tube;
a flexible diaphragm disposed at the juncture of the frustoconical mouth and the outer end of the tube, the diaphragm sealing the frustoconical mouth from the tube; and
a strain gauge disposed upon the flexible diaphragm, the strain gauge communicating electronically with the leak detector component.

7. The pipeline leak detector according to claim 6, further comprising a rotary driveshaft extending axially from the drive component, said leak detector component being disposed upon the driveshaft, said leak detector component being driven in axial rotation relative to the drive component.

8. The pipeline leak detector according to claim 6, further comprising:
a rotary driveshaft extending axially from the drive component, the rotary driveshaft having a drive component end and a sensor array end, said leak detector component being disposed upon the sensor array end of the driveshaft;
a driven wheel shaft extending radially from the central housing of the drive component, the driven wheel shaft having a proximal end disposed within the central housing and a distal end disposed externally to the housing, the driven wheel being disposed upon the distal end of the driven wheel shaft;
a first bevel gear disposed upon the driven wheel;
a second bevel gear disposed upon the distal end of the driven wheel shaft, the second bevel gear meshing with the first bevel gear;
a third bevel gear disposed upon the proximal end of the driven wheel shaft; and
a fourth bevel gear disposed upon the drive component end of the driveshaft, the third bevel gear meshing with the fourth bevel gear;
whereby rotation of the driven wheel shaft by the driven wheel rotates the driveshaft and the leak detector component thereon.

9. The pipeline leak detector according to claim 6, further comprising:
- a drive wheel strut extending radially from the drive component, the drive wheel strut having an adjustable length;
- a driven wheel strut extending radially from the drive component, the driven wheel strut having an adjustable length; and
- a stabilizer wheel strut extending radially from the drive component, the stabilizer wheel strut having an adjustable length.

10. The pipeline leak detector according to claim 6, further comprising:
- a transmitter disposed within the leak detector component; and
- a remotely disposed receiver selectively communicating with the transmitter.

11. A pipeline leak detector, comprising:
- a rotationally stationary drive component having a central housing;
- a driven wheel shaft extending radially from the central housing, the driven wheel shaft having a proximate end disposed within the central housing and a distal end disposed external to the housing;
- a driven wheel disposed upon the distal end of the driven wheel shaft;
- a rotary driveshaft extending axially from the drive component, the driveshaft having a drive component end and a sensor array end;
- a leak detector component disposed upon the sensor array end of the driveshaft;
- a leak sensor support wheel disposed circumferentially about the leak detector component;
- a single leak sensor array disposed radially outward from the leak sensor support wheel, the leak sensor array having a plurality of pressure differential sensing leak sensors thereon, each of the leak sensors communicating electronically with the leak detector component, wherein each of the pressure differential sensing leak sensors comprises:
  - a radially disposed tube having an attachment end and an outer end;
  - a frustoconical mouth extending from the outer end of the tube;
  - a flexible valve disposed at the juncture of the frustoconical mouth and the outer end of the tube, the valve being movable between an open position and a closed position in response to a change in pressure; and
  - a strain gauge disposed upon the flexible valve, the strain gauge communicating electronically with the leak detector component;
- a first bevel gear disposed upon the driven wheel;
- a second bevel gear disposed upon the distal end of the driven wheel shaft, the second bevel gear meshing with the first bevel gear;
- a third bevel gear disposed upon the proximal end of the driven wheel shaft; and
- a fourth bevel gear disposed upon the drive component end of the driveshaft, the third bevel gear meshing with the fourth bevel gear;
- whereby rotation of the driven wheel shaft by the driven wheel rotates the driveshaft and the leak detector component thereon.

12. The pipeline leak detector according to claim 11, further comprising:
- a rotationally powered drive wheel extending radially from the central housing; and
- a stabilizer wheel extending radially from the central housing, the drive wheel, the driven wheel, and the stabilizer wheel being separated from one another by substantially 120° of arc.

13. The pipeline leak detector according to claim 12, further comprising:
- a drive wheel strut extending radially from the drive component, the drive wheel strut having an adjustable length;
- a stabilizer wheel strut extending radially from the drive component, the stabilizer wheel strut having an adjustable length; and
- the driven wheel shaft having an adjustable length.

14. The pipeline leak detector according to claim 11, further comprising:
- a transmitter disposed within the leak detector component; and
- a remotely disposed receiver selectively communicating with the transmitter.

* * * * *